(No Model.)
W. STANLEY, Jr.
METHOD OF BUILDING ELECTRICAL CONVERTERS.
No. 428,575. Patented May 20, 1890.
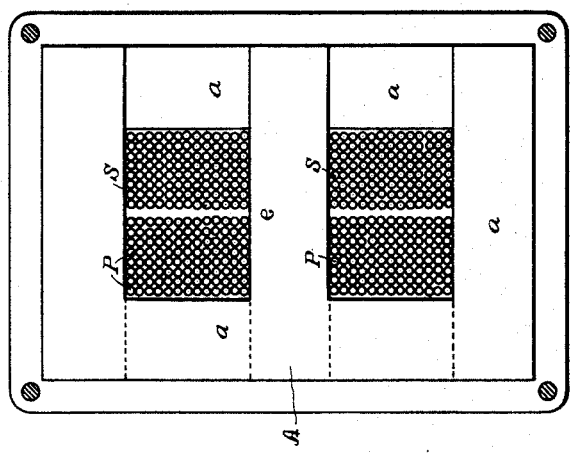
WITNESSES:
George Brown Jr.
J. William Smith
INVENTOR,
WILLIAM STANLEY, JR.
Charles A. Terry.
Att'y.

UNITED STATES PATENT OFFICE.

WILLIAM STANLEY, JR., OF GREAT BARRINGTON, MASSACHUSETTS, ASSIGNOR TO GEORGE WESTINGHOUSE, JR., OF PITTSBURG, PENNSYLVANIA.

METHOD OF BUILDING ELECTRICAL CONVERTERS.

SPECIFICATION forming part of Letters Patent No. 428,575, dated May 20, 1890.

Original application filed November 23, 1886, Serial No. 219,552. Divided and this application filed March 6, 1889. Serial No. 302,141. (No model.) Patented in England July 12, 1887, No. 9,728; in France July 12, 1887, No. 184,768; in Belgium July 12, 1887, No. 78,165; in Germany July 12, 1887, No. 43,684; in Italy July 12, 1887, XLIII, 356, and in Canada November 10, 1887, No. 27,964.

*To all whom it may concern:*

Be it known that I, WILLIAM STANLEY, Jr., a citizen of the United States, residing in Great Barrington, in the county of Berkshire, State of Massachusetts, have invented certain new Improvements in the Method of Building Electrical Converters, (Case 298,) of which the following is a specification, the same being a division of an application filed by me the 23d day of November, 1886, Serial No. 219,552, (and for which patents were granted in the following foreign countries: Great Britain, No. 9,728, July 12, 1887; Canada, No. 27,964, November 10, 1887; France, No. 184,768, July 12, 1887; Belgium, No. 78,165, July 12, 1887; Germany, No. 43,684, July 12, 1887, and Italy, No. 356, XLIII, July 12, 1887.)

The invention relates to the method of building or constructing the apparatus employed for transforming alternating pulsatory or intermittent primary electric currents into alternating secondary or induced currents. Devices for this purpose are technically termed "inductoriums," "transformers," or "converters."

When an alternating intermittent or pulsatory current is made to traverse an electric conductor a magnetic field is produced in its vicinity the intensity and polarity of which depends upon the character of the originating current, and any mass of magnetizable material—for instance, iron—situated within this field becomes magnetic. The alternating magnetization and demagnetization of such a mass of iron or the reversal of its magnetic polarity in its turn tends to produce corresponding electro-motive forces in neighboring conductors. Such electro-motive forces give rise to electric currents when these conductors form a closed circuit; hence the mass of iron reacts inductively both on the conductor traversed by the originating or primary current as well as upon any other conductor within its influence. An independent conductor thus placed within the inductive field, is called a "secondary conductor."

It is well known that in an apparatus of this kind the net efficiency of electric conversion from a primary to a secondary current with a given weight of metal is largely increased by forming the magnetizable mass, or "core," as it is technically termed, into a closed magnetic circuit or ring. It is also known that the efficiency of the apparatus is greater if the mass of iron forming the core be laminated in a direction approximately parallel to the lines of magnetic force to prevent the production of Foucault currents. Higher efficiency, other things being equal, is also assured, if the mass of magnetizable metal be symmetrically disposed about the mean axis of the transverse section of the coils formed by the primary and secondary conductors.

The object in the present invention is to provide a convenient and economical method of building a converter, combining as far as possible all the advantageous features above enumerated.

In the accompanying drawings, Figure 1 is an end view (the coils being in section) of the converter embodying the invention, and Fig. 2 is a side view of the same. Fig. 3 is a detached view (drawn to a reduced scale) showing two of the plates of which the core is composed. P S respectively represent the conducting-wires which constitute the coils of the converter. In Fig. 2 these coils are shown as separated from each other by an intervening insulating-space. These coils serve, respectively, for conducting the inducing and the induced currents.

The core A is composed of a number of plates *a a*, of magnetizable material—for example, soft iron—which may with advantage be made very thin. These plates may be separated from each other by intervening layers *b b* of non-conducting material. Each individual plate is formed with three lateral tongues projecting in the same direction, as shown in Figs. 1 and 3, so that the configuration of the finished plate resembles that of the letter E.

In building the converters the electric conductors are first wound into oval or flattened coils, which may with advantage be of rectangular cross-section, and the plates *a a* are then applied, the middle tongue *e* being inserted in the space within the coils, while the exterior tongues and the bodies of the plates surround the exterior of the coils on three sides.

In assembling the plates to form the core, each alternate plate is inserted from the opposite side, and in this way the aggregate mass of iron necessarily becomes symmetrically distributed on every side of the mean axis of the transverse section of the coiled conductors. The plates are securely bound together by means of the end frames or heads H' H², connected by longitudinal bolts *h h*.

In another application filed November 23, 1886, Serial No. 219,552, of which this is a division, I have claimed a converter of the character herein described.

I claim as my invention—

1. The hereinbefore-described method of building electrical converters having laminated cores, which consists in first winding and forming the coils of the converters and subsequently building up the cores around such coils by inserting within and extending around such coils the laminæ of the cores, such laminæ being alternately applied from opposite sides.

2. The hereinbefore-described method of building electrical converters having laminated cores, which consists in first winding and forming the coils of the converters and subsequently building up the cores of laminæ around the coils by applying each of the laminæ to two different portions of the coils simultaneously.

In testimony whereof I have hereunto subscribed my name this 28th day of February, A. D. 1889.

WILLIAM STANLEY, JR.

Witnesses:
PAILEY A. RUSSELL,
F. H. WRIGHT.